US009284068B2

(12) United States Patent
Post et al.

(10) Patent No.: US 9,284,068 B2
(45) Date of Patent: Mar. 15, 2016

(54) FAST-LOW ENERGY TRANSFER TO EARTH-MOON LAGRANGE POINT L2

(71) Applicant: The Boeing Company, Chicago, IL (US)

(72) Inventors: Kevin E. Post, League City, TX (US); Edward Belbruno, Princeton, NJ (US)

(73) Assignee: The Boeing Company, Chicago, IL (US)

(*) Notice: Subject to any disclaimer, the term of this patent is extended or adjusted under 35 U.S.C. 154(b) by 441 days.

(21) Appl. No.: 14/247,652

(22) Filed: Apr. 8, 2014

(65) Prior Publication Data

US 2015/0284111 A1    Oct. 8, 2015

(51) Int. Cl.
  *B64G 1/10*    (2006.01)
  *B64G 1/24*    (2006.01)
  *B64G 1/40*    (2006.01)

(52) U.S. Cl.
  CPC ...... *B64G 1/242* (2013.01); *B64G 1/10* (2013.01); *B64G 1/40* (2013.01)

(58) Field of Classification Search
  None
  See application file for complete search history.

(56) References Cited

U.S. PATENT DOCUMENTS

| | | | | |
|---|---|---|---|---|
| 4,943,014 A * | 7/1990 | Harwood | B64G 1/007 | 244/158.5 |
| 5,163,641 A * | 11/1992 | Yasaka | B64G 1/648 | 244/164 |
| 5,507,454 A * | 4/1996 | Dulck | H04B 7/195 | 244/158.5 |
| 5,562,266 A * | 10/1996 | Achkar | B64G 1/24 | 244/171 |
| 5,595,360 A * | 1/1997 | Spitzer | B64G 1/007 | 244/158.5 |
| 5,681,011 A * | 10/1997 | Frazier | B64G 1/242 | 244/158.5 |
| 5,961,077 A * | 10/1999 | Koppel | B64G 1/242 | 244/158.5 |
| 5,984,236 A * | 11/1999 | Keitel | B64G 1/24 | 244/164 |
| 6,015,116 A * | 1/2000 | Anzel | B64G 1/26 | 244/158.6 |
| 6,032,904 A * | 3/2000 | Hosick | B64G 1/26 | 244/169 |
| 6,059,233 A * | 5/2000 | Koppel | B64G 1/242 | 244/158.5 |
| 6,097,997 A * | 8/2000 | Belbruno | B64G 1/007 | 244/158.6 |
| 6,116,543 A * | 9/2000 | Koppel | B64G 1/002 | 244/158.5 |
| 6,186,446 B1 * | 2/2001 | Tilley | B64G 1/007 | 244/164 |
| 6,253,124 B1 * | 6/2001 | Belbruno | B64G 1/007 | 244/158.5 |
| 6,253,125 B1 * | 6/2001 | Barker | B64G 1/288 | 244/158.1 |
| 6,278,946 B1 * | 8/2001 | Belbruno | B64G 1/007 | 701/13 |

(Continued)

OTHER PUBLICATIONS

Belbruno, et al. "Chapter 16; Optimization of Low-Energy Transfers" Modeling and Optimization in Space Engineering, Springer Science+Business Media, New York, 2013, pp. 389-404.

(Continued)

*Primary Examiner* — Medhat Badawi
(74) *Attorney, Agent, or Firm* — Perman & Green, LLP

(57) ABSTRACT

A control system for a hybrid propulsion spacecraft, configured for transfer between low earth parking orbit (LEO) and a Lissajous L2 orbit (L2O), including a first control portion communicably connected to a high thrust (HT) engine portion of the hybrid propulsion spacecraft, a second control portion communicably connected to a low thrust high specific impulse (LT-HI) engine portion of the hybrid propulsion spacecraft, the first and second control portions being configured to control both the HT engine portion and the LT-HI engine portion to provide an optimal LEO to L2O transfer trajectory, wherein the optimal LEO to L2O trajectory includes an optimal LT-HI trajectory portion, selected from a stable manifold trajectory, and an optimal HT trajectory portion, and wherein the LT-HI trajectory portion and HT trajectory portion are configured for providing a combined optimal trajectory along the LEO to L2O transfer trajectory, and are optimized substantially simultaneously.

20 Claims, 7 Drawing Sheets

(56) References Cited

U.S. PATENT DOCUMENTS

| | | | | |
|---|---|---|---|---|
| 6,341,250 B1* | 1/2002 | Belbruno | | B64G 1/007 244/158.8 |
| 6,385,512 B1* | 5/2002 | Belbruno | | B64G 1/242 244/158.5 |
| 6,409,124 B2* | 6/2002 | Fleeter | | 244/110 D |
| 6,481,672 B1* | 11/2002 | Goodzeit | | B64G 1/26 244/169 |
| 6,543,723 B1* | 4/2003 | Oh | | B64G 1/007 244/158.5 |
| 6,561,461 B2* | 5/2003 | Goldstein | | B64G 1/007 244/110 D |
| 6,588,708 B2* | 7/2003 | Wang | | B64G 1/361 244/164 |
| 6,672,542 B2* | 1/2004 | Peterson | | B64G 1/26 244/158.6 |
| 6,845,950 B1* | 1/2005 | Goodzeit | | B64G 1/007 244/158.6 |
| 7,113,851 B1* | 9/2006 | Gelon | | B64G 1/007 244/158.5 |
| 8,676,407 B1* | 3/2014 | Patera | | B64G 1/242 701/13 |
| 9,108,748 B2* | 8/2015 | Munir | | B64G 1/007 |
| 9,108,749 B2* | 8/2015 | Woo | | B64G 1/24 |
| 2001/0025212 A1* | 9/2001 | Belbruno | | B64G 1/007 701/13 |
| 2002/0130222 A1* | 9/2002 | Anderman | | B64G 1/007 244/172.5 |
| 2007/0228218 A1* | 10/2007 | Brumfield | | B64G 1/363 244/171 |
| 2011/0036951 A1* | 2/2011 | Moorer | | B64G 1/1078 244/158.6 |
| 2011/0036952 A1* | 2/2011 | Moorer, Jr. | | B64G 1/007 244/158.6 |
| 2012/0018585 A1* | 1/2012 | Liu | | B64G 1/007 244/158.6 |
| 2012/0097796 A1* | 4/2012 | Munir | | B64G 1/007 244/158.6 |
| 2012/0097797 A1* | 4/2012 | Woo | | B64G 1/242 244/158.6 |
| 2012/0248253 A1* | 10/2012 | Cheetham | | B64G 1/10 244/158.8 |
| 2015/0284111 A1* | 10/2015 | Post | | B64G 1/242 244/158.6 |

OTHER PUBLICATIONS

Mingotti, et al. "Optimal Low-Thrust Invariant Manifold Trajectories via Attainable Sets". Journal of Guidance, Control and Dynamics, vol. 34, No. 6, Nov./Dec. 2011, pp. 1644-1655.

* cited by examiner

FAST-LOW ENERGY TRANSFER TO EARTH-MOON LAGRANGE POINT L2

BACKGROUND

The problem of optimizing trajectories in the three-body problem, or even the n-body problem, for n=3, 4, has been addressed in many papers throughout the years. If one had a trajectory that started from a given position and it was desired to optimize it by minimizing the maneuvers, DV, along the trajectory, the field of optimal control theory has many approaches to this problem.

The previous ways transfers were designed to Earth-Moon Lagrange point L2 from parking orbits about the Earth, without the use of optimization methods using low energy orbits on the stable manifold to Lagrange point L2 orbit and not for hybrid spacecraft with two different types of engines, is to simply do a standard differential targeting from the parking orbit, using a first maneuver to get to the beginning of the stable manifold and to a given orbit and apply a second maneuver at the stable manifold orbit to get to the Lagrange point L2 orbit. This transfer to Lagrange point L2 orbit using the two maneuvers is found with standard 'differential targeting' together with use of a stable manifold. With such a method of determining the transfer to Lagrange point L2 orbit, one could apply a local optimizer just valid at the specific maneuver points, which is only valid for chemical/impulsive maneuvers and is not valid for hybrid spacecraft. In another method the transfer to Lagrange point L2 orbit may be determined using low thrust only or impulsive thrust only however, the low thrust only or impulsive thrust only method is not valid for hybrid spacecraft.

Low-energy Earth-Moon transfers with longer flight times of 90 days are also used for the transfer to Lagrange point L2 orbit (e.g. GRAIL mission). However, these a low energy solutions for transfer to Lagrange point L2 orbit utilize an exterior ballistic capture transfer with a flight time of 90-150 days and are not relevant to transfers having flight times around 6 days.

SUMMARY

Accordingly, a spacecraft control system and method, intended to address the above-identified concerns, would find utility.

One example of the present disclosure relates to a control system for a hybrid propulsion spacecraft configured for transfer between any suitable low earth parking orbit (referred to herein as "LEO"), such as an elliptical orbit or circular orbit, and a Lissajous L2 orbit (referred to herein as "L2O") is provided. The control system includes a first control portion communicably connected to a high thrust (referred to herein as "HT") engine portion of the hybrid propulsion spacecraft; a second control portion communicably connected to a low thrust high specific impulse (referred to herein as "LT-HI") engine portion of the hybrid propulsion spacecraft; the first and second control portions being configured to control both the HT engine portion and the LT-HI engine portion of the hybrid propulsion spacecraft to provide an optimal LEO to L2O transfer trajectory; wherein the optimal LEO to L2O trajectory includes an optimal LT-HI trajectory portion, selected from a stable manifold trajectory, and an optimal HT trajectory portion, and wherein the LT-HI trajectory portion and HT trajectory portion are configured for providing a combined optimal trajectory along the LEO to L2O transfer trajectory, and are optimized substantially simultaneously.

One example of the present disclosure relates to a spacecraft including a spacecraft bus; a hybrid propulsion system connected to the spacecraft bus, the hybrid propulsion system including a high thrust (HT) engine portion, and a low thrust high specific impulse (LT-HI) engine portion; and a control system connected to the bus and controllably coupled to hybrid propulsion system to effect spacecraft transfer between low earth parking orbit (LEO) and a Lissajous L2 orbit (L2O), the control system being configured for generating an optimal LEO to L2O transfer trajectory employing both the HT engine portion and the LT-HI engine portion of the hybrid propulsion system; wherein the optimal LEO to L2O trajectory includes an optimal LT-HI trajectory portion, selected from a stable manifold trajectory, and an optimal HT trajectory portion, and wherein the LT-HI trajectory portion and HT trajectory portion are configured for providing a combined optimal trajectory along the LEO to L2O transfer trajectory, and are optimized substantially simultaneously.

One example of the present disclosure relates to a method for generating a thrusting profile for a hybrid propulsion spacecraft for transfer between low earth orbit (LEO) and a Lissajous L2 orbit (L2O). The method includes the steps of: computing a stable manifold (SM) of trajectories leading to L2O based on thrust generated with a low thrust high specific impulse (LT-HI) engine of the hybrid propulsion spacecraft; generating a high thrust (HT) trajectory between LEO and at least one trajectory of the SM, wherein the HT trajectory is generated based at least in part with an impulse change provided by an HT engine of the hybrid propulsion spacecraft, and wherein the HT trajectory and the at least one SM trajectory form a combined trajectory from LEO to L2O; and optimizing the combined trajectory over both the HT trajectory and the at least one trajectory of the SM in combination and generating a combined optimal trajectory from LEO to L2O.

BRIEF DESCRIPTION OF THE DRAWINGS

Figure 1:
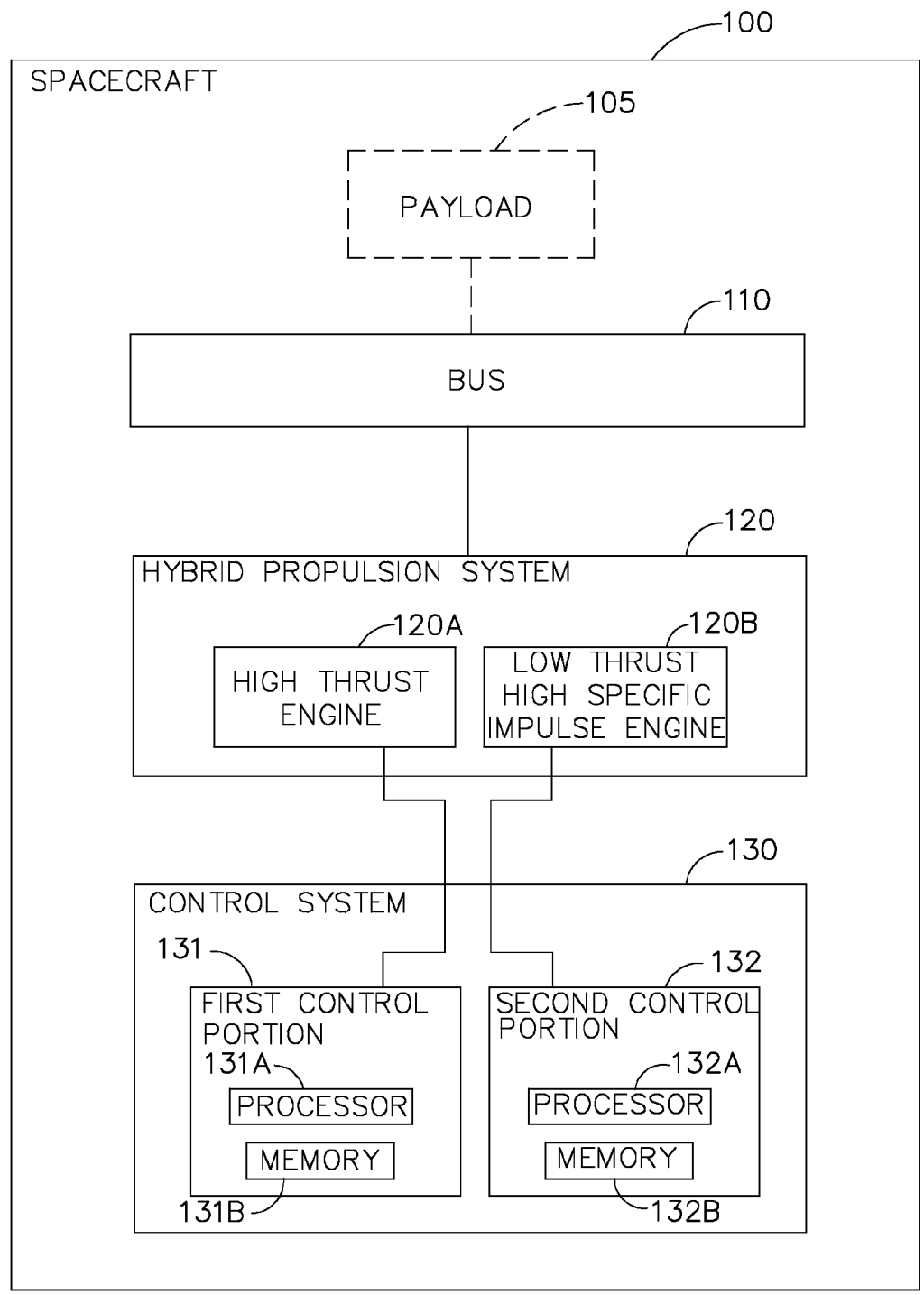
Figure 2:
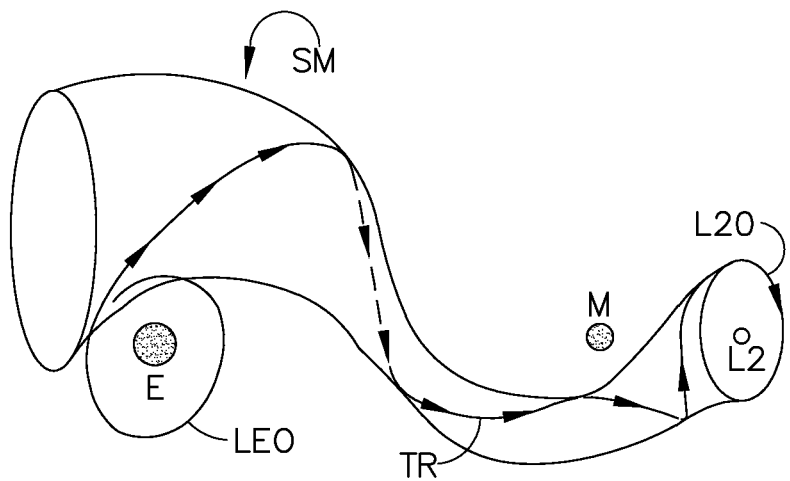
Figure 3:
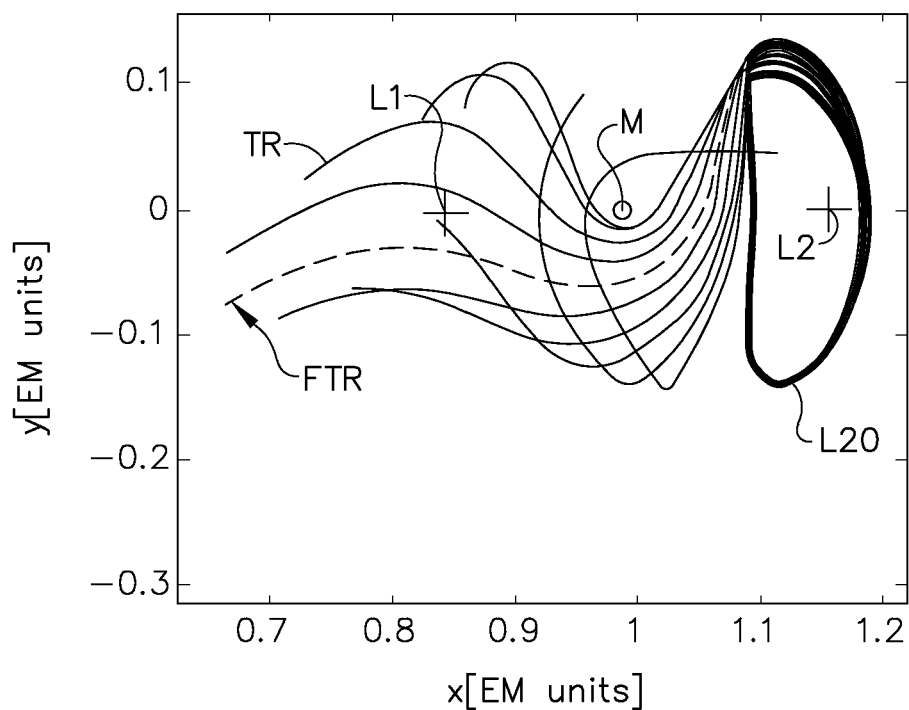
Figure 4:
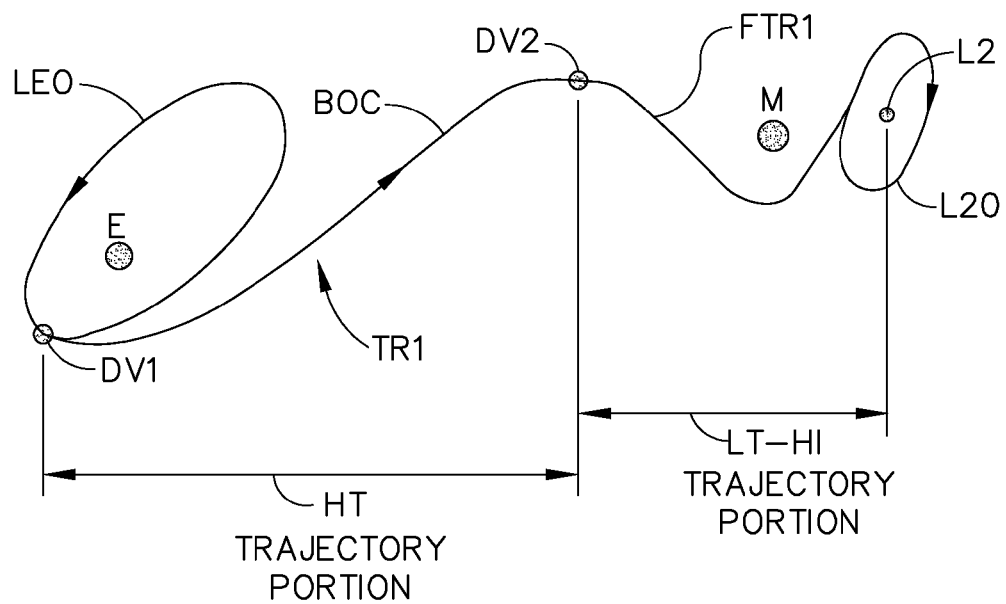
Figure 5:
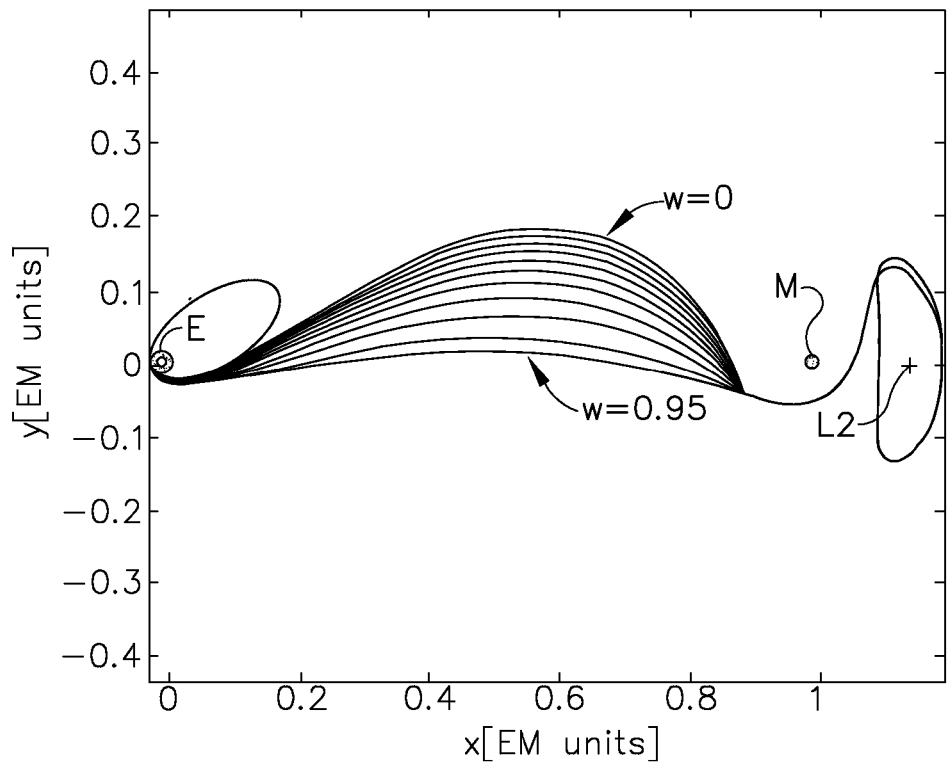
Figure 6:
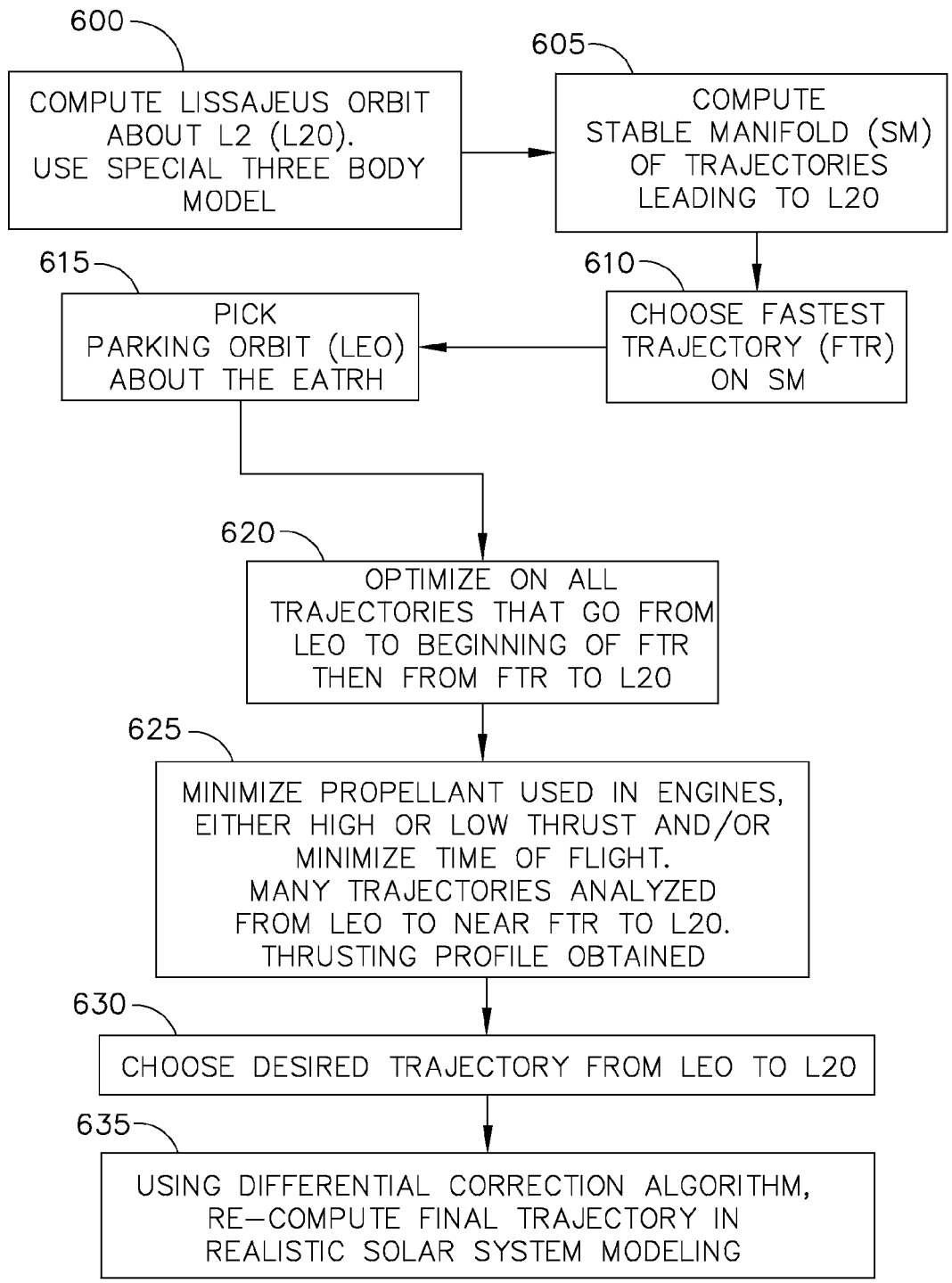
Figure 7:
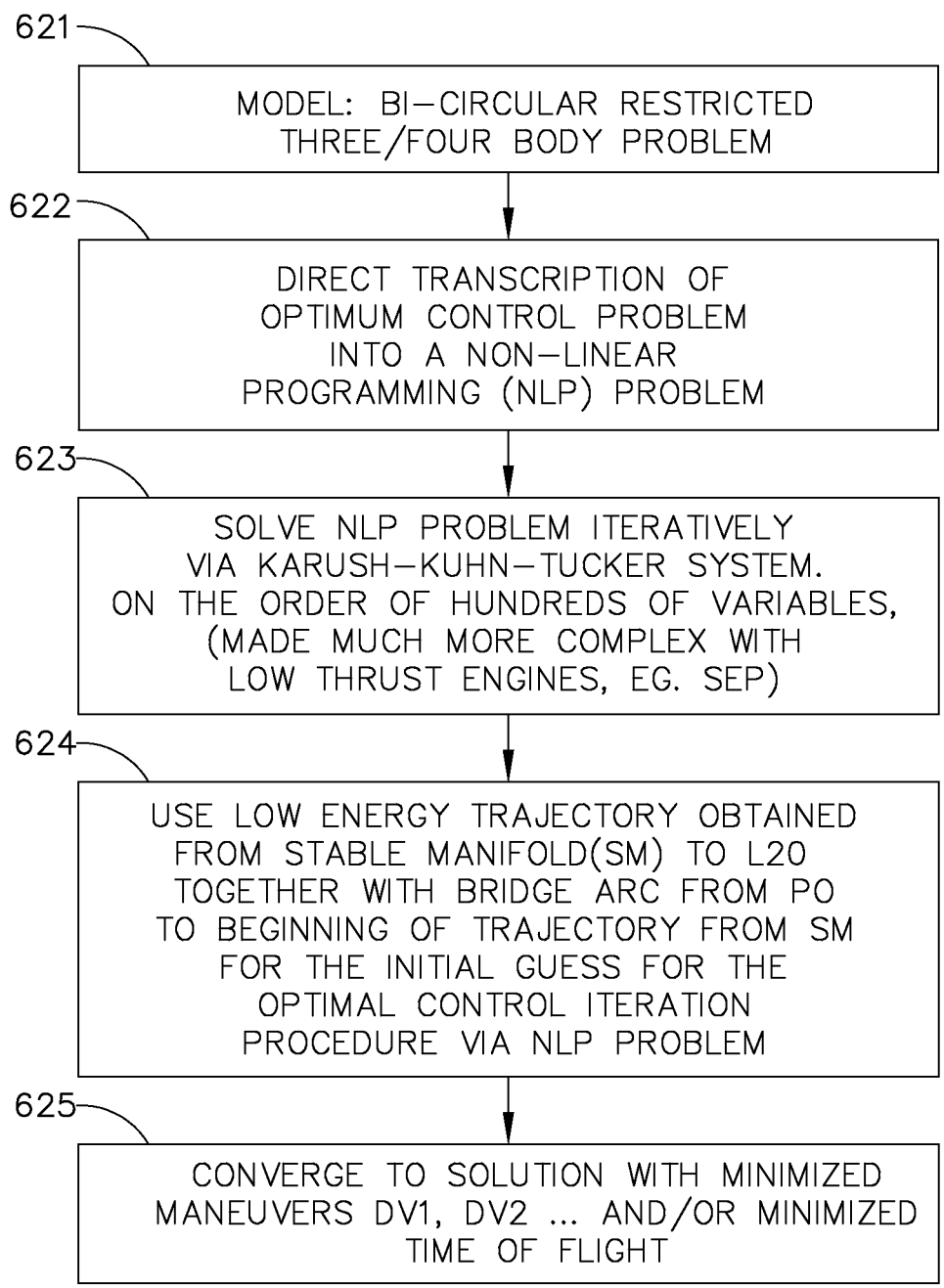
Figure 8:
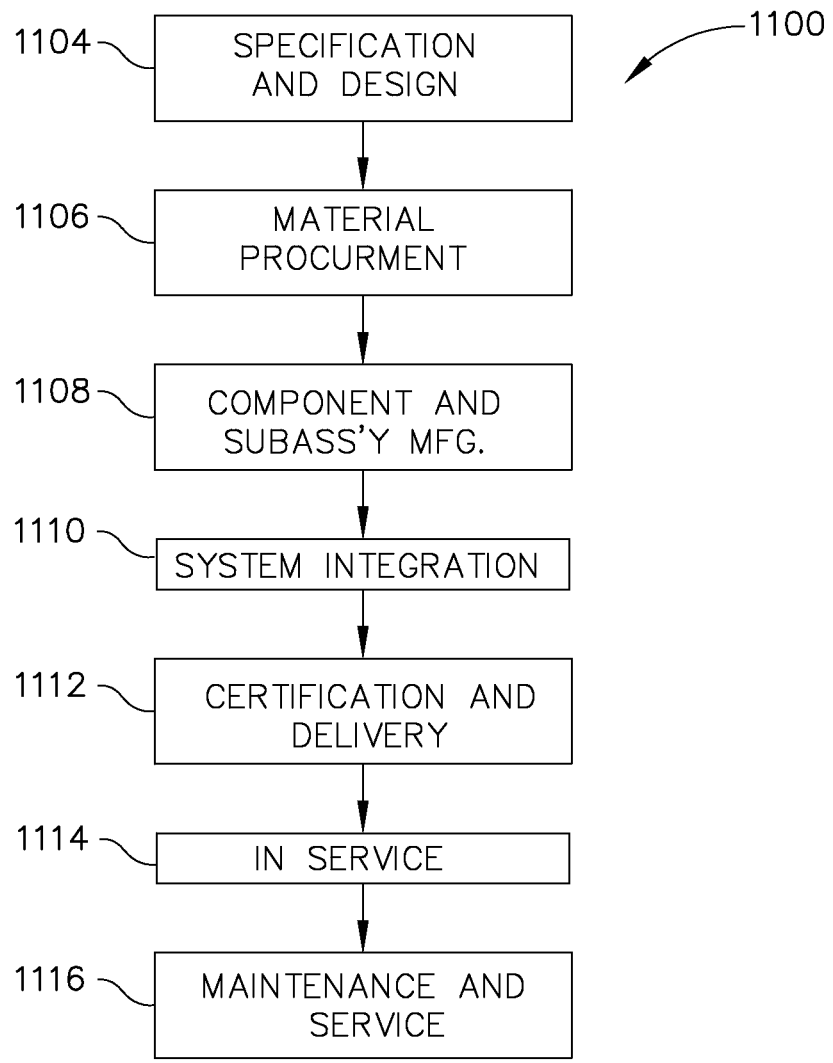

Having thus described examples of the disclosure in general terms, reference will now be made to the accompanying drawings, which are not necessarily drawn to scale, and wherein like reference characters designate the same or similar parts throughout the several views, and wherein:

FIG. 1 is a block diagram of a spacecraft, according to one aspect of the present disclosure;

FIG. 2 is a schematic diagram of a trajectory on the stable manifold to an orbit around Lagrange point L2 (referred to herein as "L2"), according to one aspect of the disclosure;

FIG. 3 is a schematic diagram of multiple trajectories on the stable manifold to an orbit about L2, according to one aspect of the disclosure;

FIG. 4 is a schematic illustration of the construction of a fast low energy transfer to an orbit around L2, according to one aspect of the disclosure;

FIG. 5 is a schematic illustration of a family of trajectories forming bridge orbit arcs, according to one aspect of the disclosure;

FIG. 6 is a flow chart for obtaining a fast transfer to orbit about L2, according to one aspect of the disclosure;

FIG. 7 is a flow chart of illustrating an optimization of the fast transfer to orbit about L2, according to one aspect of the disclosure;

FIG. 8 is a flow diagram of spacecraft production and service methodology; and

Figure 9:
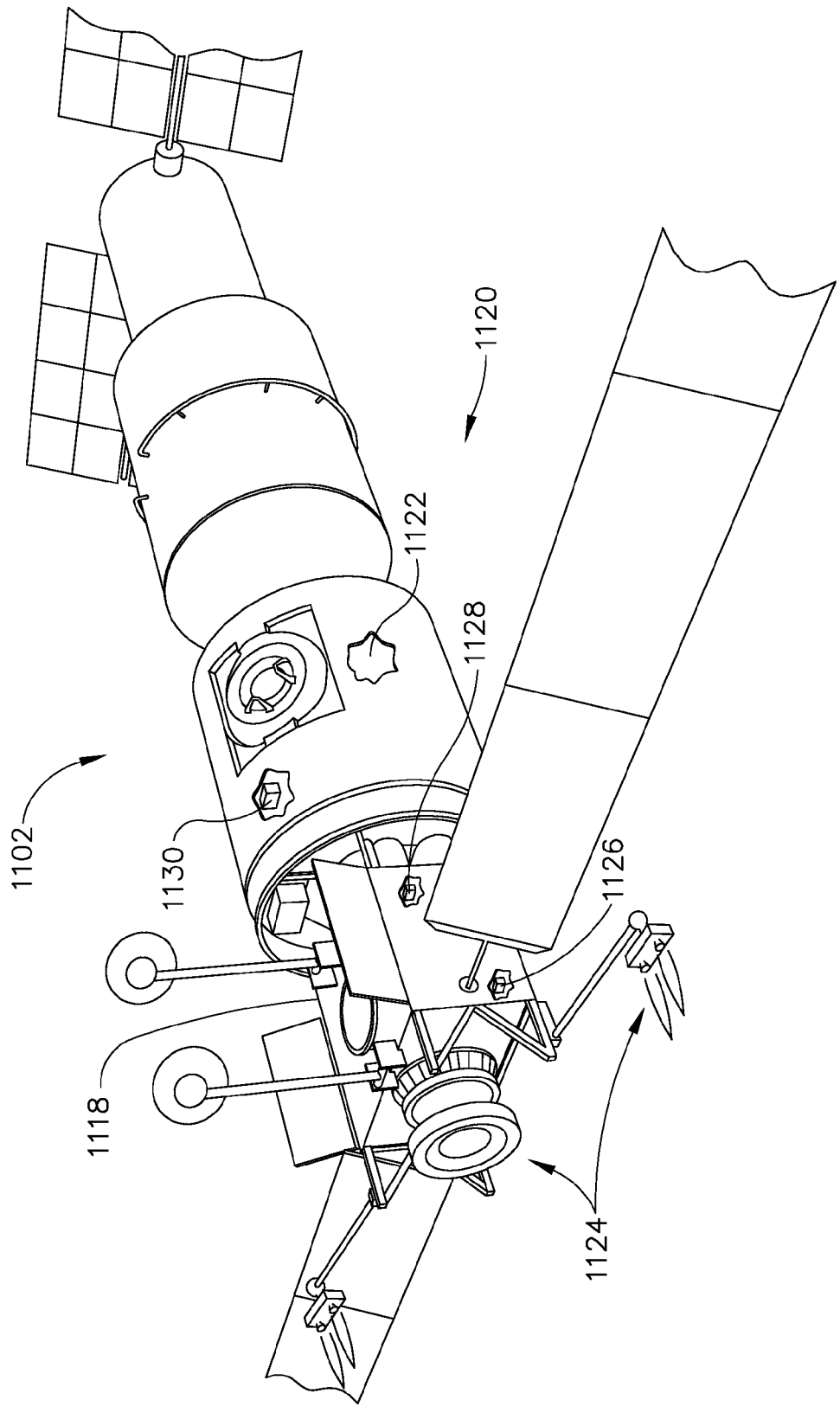

FIG. 9 is a schematic illustration of an spacecraft.

In the block diagram(s) referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. Couplings other than those depicted in the block diagrams may also exist. Dashed lines, if any, connecting the various elements and/or components represent couplings similar in function and purpose to those represented by solid lines; however, couplings represented by the dashed lines may either be selectively provided or may relate to alternative or optional aspects of the disclosure. Likewise, elements and/or components, if any, represented with dashed lines, indicate alternative or optional aspects of the disclosure. Environmental elements, if any, are represented with dotted lines.

In the block diagram(s) referred to above, the blocks may also represent operations and/or portions thereof. Lines connecting the various blocks do not imply any particular order or dependency of the operations or portions thereof.

DETAILED DESCRIPTION

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Reference herein to "one example" or "one aspect" means that one or more feature, structure, or characteristic described in connection with the example or aspect is included in at least one implementation. The phrase "one example" or "one aspect" in various places in the specification may or may not be referring to the same example or aspect.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Referring to FIG. 1, a block diagram of a spacecraft 100 is illustrated in accordance with aspects of the present disclosure. The present disclosure relates to a class of solutions for the low energy transfer of the spacecraft 100 to a Lissajous L2 orbit (L2O), inclusive of a Lyapunov orbit, with flight times similar to those of Hohmann transfers (e.g. flight times on the order of a few days such as for exemplary purposes only about 6 to 7 days). The low energy transfer to L2O of the present disclosure may use about 20% less maneuvers along the flight trajectory than, for example, Hohmann transfers by using a predetermined bridge orbit arc trajectory from, for example, a parking orbit around the Earth to the beginning of an orbit on the stable manifold of low energy trajectories leading to an automatic or ballistic capture of a spacecraft about L2 for placing the spacecraft 100 into L2O.

The aspects of the present disclosure use an initial transfer of the spacecraft 100 from a parking orbit about the Earth that is of a short duration, but uses substantially less fuel/propellant than conventional transfer trajectories from the parking orbit to, for example, the stable manifold. The transfer trajectory of the present disclosure is optimized for hybrid spacecraft and performed for both the HT engine and the LT-HI engine substantially simultaneously in regions with low energy trajectories on stable manifolds and weak stability boundaries. Determination of the transfer trajectory of the present disclosure uses information from dynamical systems methods to find locations where low fuel/propellant trajectories can be found. The low propellant property of the trajectory and its fast flight time, together with the method by which it is determined, makes the present disclosure useful for bringing large payloads to the Earth-Moon L2 in a more economical manner than conventional flight trajectories.

Still referring to FIG. 1 the spacecraft 100 includes a spacecraft bus (referred to herein as "bus") 110. The bus 110 may have any suitable configuration to, for example, carry any suitable manned and/or unmanned payload 105 for transfer between a low earth parking orbit (LEO) and a Lissajous L2 orbit (L2O). The bus 110 may also include any suitable hybrid propulsion system that is connected to the bus 110 in any suitable manner. The hybrid propulsion system 120 may include two or more different types of engines. In one aspect of the present disclosure the hybrid propulsion system 120 includes a HT engine 120A and the LT-HI engine 120B. The LT-HI engine 120B may be any suitable engine such as, for example, one or more solar electric propulsion (SEP) engines. The HT engine 120A may be any suitable engine such as a chemically powered engine. The bus 110 may also include any suitable control system 130 that is connected to the bus in any suitable manner where the control system is controllably coupled to the hybrid propulsion system 120 to effect spacecraft 100 transfer between a LEO and a L2O. The control system 130 may include a first control portion 131 and a second control portion 132 where each control portion includes a processor 131A, 132A and a memory 131B, 132B including non-transitory program code and being configured to perform the aspects of the present disclosure as described herein. The first control portion 131 may be communicably connected to the HT engine 120A while the second control portion 132 may be communicably connected to the LT-HI engine 120B. In other aspects, the first control portion 131 may be communicably connected to the LT-HI engine 120B while the second control portion 132 may be communicably connected to the HT engine 120A. The control system 130 may be configured to generate an optimal LEO to L2O transfer trajectory employing both the HT engine 120A and the LT-HI engine 120B. For example, the first and second control portions 131, 132 may be configured, as described below, to control both the HT engine 120A and the LT-HI engine 120B of the hybrid spacecraft 100 and provide an optimal LEO to L2O transfer trajectory. The optimal LEO to L2O trajectory may include an optimal LT-HI trajectory portion (FIG. 4) that is selected from a stable manifold trajectory as will be described below. The optimal LEO to L2O trajectory may also include an optimal HT trajectory portion (FIG. 4) such as, for example, a bridge orbit arc that may be selected from a manifold of bridge orbit arcs as will be described below. The HT trajectory portion transits between LEO and an initial point along the LT-HI trajectory portion as described herein. The LT-HI trajectory portion and the HT trajectory portion may be configured for providing a combined optimal trajectory along the LEO to L2O transfer trajectory, and are optimized substantially simultaneously by the control system 131. In one aspect the LT-HI trajectory portion is a time-optimal trajectory in that the LT-HI trajectory portion provides transfer from LEO to L2O in the shortest possible time. The LT-HI trajectory also effects ballistic capture of the spacecraft 100 at L2O as described herein. The HT trajectory portion may be at least one of a time optimal trajectory and a fuel optimal trajectory in that the HT trajectory portion may provide transfer of the spacecraft in the shortest time possible and/or using the least amount of fuel/propellant.

Referring now to FIGS. 2-5, determining a fast low energy transfer trajectory from LEO to L2O will be described. With particular reference to FIG. 2, the spacecraft 100 may start from any suitable parking orbit LEO and transfer to the L2O orbit, which may be retrograde periodic closed orbit in a frame of reference called a rotating frame where the Earth E and Moon M are fixed. L2O, in the higher dimensional position-velocity space, has a tube of orbits or stable manifold SM that lead to L2O and spiral asymptotically into L2O. One such trajectory TR of the stable manifold SM is illustrated in FIG. 2. The trajectories on the stable manifold SM may be minimal energy trajectories because they automatically provide transfer to L2O by spiraling towards L2O and asymptotically converge into L2O. As such, a spacecraft 100 traveling along the stable manifold SM trajectories (also called manifold branches) TR will need substantially no fuel to go into orbit about L2 as the spacecraft 100 will be ballistically captured in a weak stability boundary region about L2O where L2O may be considered part of the weak stability boundary.

With particular reference to FIG. 3, as may be realized, there are infinitely many trajectories TR on the stable manifold SM. In FIG. 3, it is noted that the Earth E would be located at x=0 (not shown in FIG. 3) and L1 is an interior Lagrange point between the Earth E and the Moon M. In the aspects of the present disclosure a trajectory FTR, illustrated as a dashed line in FIG. 3, is determined where the trajectory FTR is a trajectory on the stable manifold SM that provides a relatively fast transfer to L2O (e.g. FTR may be substantially the fastest transfer of the all trajectories TR). The trajectory FTR may also have a starting point near the Earth E in a location proximate the parking orbit LEO of the spacecraft 100 to for providing an advantageous or otherwise convenient transfer of the spacecraft 100 from LEO to the trajectory FTR. It is noted that the trajectories TR, FTR illustrated in FIG. 3 may be actual trajectories determined by, for example, the control system 130 using, for example, a planar restricted three body problem between the Earth E, the Moon M, and the spacecraft 100. In this problem it is assumed that the Moon M moves about the Earth E in a circle with uniform velocity, and spacecraft 100 moves in the same plane as the Moon's orbit.

In one aspect the control system 130 (e.g. one or more of the first control portion 131 and the second control portion 132) may be configured with suitable non-transitory program code for determining the fast low fuel transfer trajectory from LEO to L2O. The control system 130 may be configured to determine a combined optimal trajectory (e.g. both the LT-HI trajectory portion and the HT trajectory portion) that is optimized with a global optimizer (GO) approach that is configured for application of hybrid propulsion in effecting the combined optimal trajectory. In accordance with the present disclosure the first control portion 131 and the second control portion 132 command a respective one of the HT engine 120A and the LT-HI engine 120B and effect spacecraft 100 transfer with hybrid propulsion along the combined optimal trajectory commencing with an initial impulse change (e.g. maneuver DV1) from LEO to an initiation of ballistic capture (e.g. maneuver DV2) into L2O.

With particular reference to FIG. 4 and FIG. 6 the control system 130 may compute or otherwise determine L2O using, for example, the three body model/problem described above (FIG. 6, Block 600). The stable manifold SM trajectories TR leading to L2O may also be determined (FIG. 6, Block 605) and the fastest trajectory FTR may be selected (FIG. 6, Block 610). The control system 130 may also determine the LEO or utilize the LEO in which the spacecraft 100 is located (FIG. 6, Block 615). Substantially all bridge orbit arc trajectories BOC that go from LEO to the beginning of trajectory FTR and the trajectories from FTR to L2O (e.g. the manifold branch trajectories) are optimized (FIG. 6, Block 620) to minimize an amount of fuel/propellant used in the HT engine 120A and LT-HI engine and/or to minimize a time of flight from LEO to L2O to obtain a thrusting profile (FIG. 6, Block 625). It is noted that the optimization described herein is a "global" optimization as opposed to a "local" optimization. A local optimizer optimizes a trajectory only very near to a given initial point in position-velocity space, whereas a global optimizer optimizes along an entire trajectory and near to the trajectory.

For example, the optimization of the bridge orbit arc trajectories BOC and the manifold branch trajectories may include modeling a bi-circular restricted three/four body problem (FIG. 7, Block 621). An optimum control problem obtained from the three/four body problem is transcribed into a non-linear programming (NLP) problem (FIG. 7, Block 622). In one aspect, the NLP programming problem is adapted to the different engine types of the hybrid spacecraft 100 (e.g. the HI engine and the LT-HI engine). For example, an initial trajectory TR1 is chosen for optimization. Part of this trajectory TR1 lies on the stable manifold SM (e.g. manifold branch or trajectory FTR1, e.g. the LT-HI trajectory portion) leading to L2O. The optimization is typically to minimize the cumulative velocity change (e.g. performed by maneuvers DV1, DV2, etc.) that is required along the entire trajectory TR1 so that the trajectory TR1 can start at a given point (such as a point on LEO) and end at another given point (such as a point on or near L2O). A system of differential equations is used to define the motion of the spacecraft 100, which in this case is for the three/four body problem. These differential equations define the evolution of the position and velocity of the spacecraft 100 as a function of time. By way of example, initial boundary conditions, representing the first transfer state, $x_i=(x_i, y_i, \dot{x}_i, \dot{y}_i, m_i)$ correspond to the spacecraft 100 parking orbit LEO, which may be a conic section. Accordingly, the initial boundary conditions may be represented by a set of equations describing the parking orbit LEO of the spacecraft 100. Also, final boundary conditions, expressing the final transfer state $x_f=(x_f, y_f, \dot{x}_f, \dot{y}_f, m_f)$ are disposed in the stable manifold so that $x_f-x_s=0$, $y_f-y_s=0$, $\dot{x}_f-\dot{x}_s=0$, and $\dot{y}_f-\dot{y}_s=0$. As may be realized, a further matching constraint(s) may be applied so that a transition state where the trajectory transition between the HT trajectory portion and the LT-HI trajectory portion on the stable manifold, describes a point on the stable manifold with a tangential vector to the stable manifold. A special function is determined, called the performance index, which is desired to be minimized. The index of performance function, may be referred to as the Jacobi integral for the equations of motion of the system, and also defines the mass portion used to effect the transfer $J=m_i-m_f$ where $m_i$ is the initial mass of the spacecraft 100, and $m_f$ is the final mass of the spacecraft 100. This results in the system of Euler differential equations, the solution of which can be reduced to a nonlinear programming problem NLP by the method of direct transcription.

The NLP can be solved iteratively by first reducing it to a nonlinear algebraic system and then to a linear system, called a Karush-Kuhn-Tucker system, at each step of the iteration (FIG. 7, 623). A suitable NLP optimization is illustrated in Fasano, Giorgio and Pintér, János D., *Modeling and Optimization in Space Engineering*, Springer 2013 at pages 389-404 (Chapter 16: Optimization of Low-Energy Transfer) the contents of which are incorporated by reference herein in its entirety. A convergence criterion is determined for the iterative algorithmic procedure to finish. The convergence determines the magnitudes of maneuvers DV1, DV2, etc. (any suitable number of maneuvers may be determined) along the trajectory TR1, which could be either impulsive, in the case of HT engine 120A, or continuous, over optimal time intervals, also determined, as well as thrust directions at each moment in time, in the case of LT-HI engine 120B.

As described above, a low energy trajectory FTR1 obtained from the stable manifold SM (e.g. the LT-HI trajectory portion) together with a bridge orbit arc BOC (e.g. the HT trajectory portion) may be selected and used as a start for the optimal control iteration procedure for solving the NLP problem (FIG. 7, Block 624) such that the solution converges with minimized maneuvers DV1, DV2, etc. (any number of suitable maneuvers may be determined) and/or a minimized time of flight. In one aspect the HT trajectory portion (e.g. the bridge orbit arc BOC) of the trajectory TR1 may be chosen from a manifold of HT trajectories (e.g. a manifold of bridge orbit arcs) distributed between a time optimal trajectory and a fuel optimal trajectory.

Further, obtaining the thrusting profile puts in a maneuver DV1 at the start of a trajectory at the periapsis of the LEO. This maneuver DV1 is assumed to be done impulsively using the HT engine 120A. A bridge orbit arc trajectory BOC goes from the location of the maneuver DV1 to the beginning of the fastest manifold branch or trajectory FTR. Another maneuver DV2 is done at a location where the bridge orbit arc trajectory BOC meets the fastest trajectory FTR to match the conditions of the fastest trajectory FTR. In one aspect the maneuver DV2 could be done over time with the LT-HI engine 120B, or in another aspect, impulsively with HT engine 120A. For the trajectory illustrated in, for example, FIG. 4 the maneuver DV2 may be done with the HT engine 120A. Once the maneuver DV2 is applied the fastest trajectory FTR takes the spacecraft 100 to L2O. In one aspect the LT-HI engine 120B can be used if desired for trim maneuvers. The control system 130 may be configured to apply a weighting value W (which measures a weighting of the speed to the fuel/propellant consumption) in the optimization of the trajectory, as illustrated in FIG. 5, W=1 corresponds to the fastest bridge orbit arc BOC with maximum fuel usage and W=0 corresponds to the slowest bridge orbit arc BOC and minimum fuel usage. As may be realized, low thrust trim maneuvers can easily be inserted and optimized as the fastest trajectory FTR is spiraling towards L2O. In the optimization there are many trajectories that are analyzed for choosing the fastest manifold branch or trajectory (which may the same trajectory FTR that was initially chosen as the fastest trajectory or a trajectory near the fastest trajectory that best fits between the bridge orbit arc trajectory BOC and L2O) from LEO to L2O (FIG. 6, Block 630).

As an example of the optimization described herein, the value of w chosen for a desired fast low prop transfer may be for w=1. The final trajectory has been found for the LEO about the Earth with a periapsis of about 653 km Earth altitude and apoapsis of about 70,000 km. The Lissajous orbit, L2O has the dimensions of about 25,400 km×about 60,000 km. The time of flight to go from the LEO to the beginning of L2O is about 6 to about 7 days. The phase-in to L2O while the trajectory spirals, can take about another 20 days, or be facilitated using other maneuvers of desired. The phase in process is not included in the flight time of the trajectory of about 6 to about 7 days, where an end time sufficiently close to the Lissajous orbit is chosen. The total fuel consumed, for the engine and propellant parameters given is about 3386 kg. By comparison, a classical Hohmann transfer would take about 6.2 days to reach L2O from LEO and requires about 4089 kg of fuel. Thus, the new fast low energy transfer has an analogous time of flight and uses about 17.2% less fuel. If the total maneuvers are compared, then the fast low energy transfer used about 1002 m/s whereas the Hohmann transfer used about 1259 m/s, showing a savings of about 21.5%.

As noted above, trajectory optimization uses the three/four body problem which may imply that the trajectory is planar in nature, lying in the same plane as the orbit of the Moon about the Earth. To obtain a trajectory that is valid for realistic solar system modeling, using a planetary ephemeris and in three dimensions, a differential correction algorithm may be applied to recompute a final trajectory from LEO to L2O in realistic solar system modeling (FIG. 6, Block 635). In this case the trajectory is obtained in three-dimensions, but is still essentially planar in nature. It is noted that the trajectory from LEO to L2O in accordance with the aspects of the present disclosure may remain substantially the same (e.g. giving the transfer from LEO to L2O a unique hybrid form) if any low thrust trim maneuvers are inserted along the trajectory or included only in the part of the trajectory that is asymptotically close to the L2O at the end of the transfer from LEO to L2O.

The aspects of the present disclosure described herein provide low fuel/low energy trajectories from the Earth into a Lissajous orbit about L2 of the Earth-Moon system that have flight times of just a few days, similar to that of a Hohmann transfer, however the trajectories of the present disclosure use substantially less fuel for a hybrid spacecraft 100. The aspects of the present disclosure also utilize an optimization algorithm that is able to optimize, for example, two different engines types (e.g. the HT and LT-HI engines) of the hybrid spacecraft 100 substantially simultaneously and in regions where there are stable manifolds of low energy trajectories leading to automatic or ballistic capture of the spacecraft 100 about L2.

The disclosure and drawing figures describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, in some aspects of the disclosure, not all operations described herein need be performed.

Examples of the disclosure may be described in the context of an spacecraft manufacturing and service method 1100 as shown in FIG. 8 and an spacecraft 1102 (which is substantially similar to spacecraft 100 described above) as shown in FIG. 9. During pre-production, illustrative method 1100 may include specification and design 1104 of the spacecraft 1102 and material procurement 1106. During production, component and subassembly manufacturing 1108 and system integration 1110 of the spacecraft 1102 take place. Thereafter, the spacecraft 1102 may go through certification and delivery 1112 to be placed in service 1114. While in service by a customer, the spacecraft 1102 is scheduled for routine maintenance and service 1116 (which may also include modification, reconfiguration, refurbishment, and so on).

Each of the processes of the illustrative method 1100 may be performed or carried out by a system integrator, a third party, and/or an operator (e.g., a customer). For the purposes of this description, a system integrator may include, without limitation, any number of spacecraft manufacturers and major-system subcontractors; a third party may include, without limitation, any number of vendors, subcontractors, and suppliers; and an operator may be an airline, leasing company, military entity, service organization, and so on.

As shown in FIG. 9, the spacecraft 1102 produced by the illustrative method 100 may include an airframe 1118 with a plurality of high-level systems and an interior 1122. Examples of high-level systems include one or more of a propulsion system 1124, an electrical system 1126, a hydraulic system 1128, and an environmental system 1130. Any number of other systems may be included. Although an aerospace example is shown, the principles of the invention may be applied to other industries.

Apparatus and methods shown or described herein may be employed during any one or more of the stages of the manufacturing and service method 1100. For example, components or subassemblies corresponding to component and subassembly manufacturing 1108 may be fabricated or manufactured in a manner similar to components or subassemblies produced while the spacecraft 1102 is in service. Also, one or more aspects of the apparatus, method, or combination thereof may be utilized during the production states 1108 and 1110, for example, by substantially expediting assembly of or reducing the cost of an spacecraft 1102. Similarly, one or more aspects of the apparatus or method realizations, or a combination thereof, may be utilized, for example and without limitation, while the spacecraft 1102 is in service, e.g., maintenance and service 1116.

Different examples and aspects of the apparatus and methods are disclosed herein that include a variety of components, features, and functionality. It should be understood that the various examples and aspects of the apparatus and methods disclosed herein may include any of the components, features, and functionality of any of the other examples and aspects of the apparatus and methods disclosed herein in any combination, and all of such possibilities are intended to be within the spirit and scope of the present disclosure.

Many modifications and other examples of the disclosure set forth herein will come to mind to one skilled in the art to which the disclosure pertains having the benefit of the teachings presented in the foregoing descriptions and the associated drawings.

In accordance with one or more aspects of the present disclosure a control system for a hybrid propulsion spacecraft configured for transfer between low earth parking orbit (LEO) and a Lissajous L2 orbit (L2O) is provided. The control system includes a first control portion communicably connected to a high thrust (HT) engine portion of the hybrid propulsion spacecraft; a second control portion communicably connected to a low thrust high specific impulse (LT-HI) engine portion of the hybrid propulsion spacecraft; and the first and second control portions being configured to control both the HT engine portion and the LT-HI engine portion of the hybrid propulsion spacecraft to provide an optimal LEO to L2O transfer trajectory; wherein the optimal LEO to L2O trajectory includes an optimal LT-HI trajectory portion, selected from a stable manifold trajectory, and an optimal HT trajectory portion, and wherein the LT-HI trajectory portion and HT trajectory portion are configured for providing a combined optimal trajectory along the LEO to L2O transfer trajectory, and are optimized substantially simultaneously.

In accordance with one or more aspects of the present disclosure the LT-HI trajectory portion is a time optimal trajectory In accordance with one or more aspects of the present disclosure the LT-HI trajectory effects ballistic capture of the spacecraft at L2O.

In accordance with one or more aspects of the present disclosure the HT trajectory portion is at least one of a time optimal trajectory and a fuel optimal trajectory.

In accordance with one or more aspects of the present disclosure the HT trajectory portion is selected from a manifold of HT trajectories distributed between a time optimal trajectory and a fuel optimal trajectory.

In accordance with one or more aspects of the present disclosure the combined optimal trajectory is optimized with a global optimizer (GO) approach that is configured for application of hybrid propulsion in effecting the combined optimal trajectory.

In accordance with one or more aspects of the present disclosure the first and second control portions command the HT engine portion and the LT-HI engine portion and effect spacecraft transfer with hybrid propulsion along the combined optimal trajectory commencing with an initial impulse change from LEO to initiation of ballistic capture in L2O.

In accordance with one or more aspects of the present disclosure the HT trajectory portion transits between LEO and an initial point along the LT-HI trajectory portion.

In accordance with one or more aspects of the present disclosure the LT-HI engine portion comprises solar electric propulsion (SEP) engines.

In accordance with one or more aspects of the present disclosure the LT-HI engine portion comprises chemical engines.

In accordance with one or more aspects of the present disclosure a spacecraft includes a spacecraft bus; a hybrid propulsion system connected to the spacecraft bus, the hybrid propulsion system including a high thrust (HT) engine portion, and a low thrust high specific impulse (LT-HI) engine portion; and a control system connected to the bus and controllably coupled to hybrid propulsion system to effect spacecraft transfer between low earth parking orbit (LEO) and a Lissajous L2 orbit (L2O), the control system being configured for generating an optimal LEO to L2O transfer trajectory employing both the HT engine portion and the LT-HI engine portion of the hybrid propulsion system; wherein the optimal LEO to L2O trajectory includes an optimal LT-HI trajectory portion, selected from a stable manifold trajectory, and an optimal HT trajectory portion, and wherein the LT-HI trajectory portion and HT trajectory portion are configured for providing a combined optimal trajectory along the LEO to L2O transfer trajectory, and are optimized substantially simultaneously.

In accordance with one or more aspects of the present disclosure the LT-HI trajectory portion is a time optimal trajectory.

In accordance with one or more aspects of the present disclosure the LT-HI trajectory effects ballistic capture of the spacecraft at L2O.

In accordance with one or more aspects of the present disclosure the HT trajectory portion is at least one of a time optimal trajectory and a fuel optimal trajectory.

In accordance with one or more aspects of the present disclosure the HT trajectory portion is selected from a manifold of HT trajectories distributed between a time optimal trajectory and a fuel optimal trajectory.

In accordance with one or more aspects of the present disclosure the combined optimal trajectory is optimized with a global optimizer (GO) approach that is configured for application of hybrid propulsion in effecting the combined optimal trajectory.

In accordance with one or more aspects of the present disclosure the first and second control portions command the HT engine portion and the LT-HI engine portion and effect spacecraft transfer with hybrid propulsion along the combined optimal trajectory commencing with an initial impulse change from LEO to initiation of ballistic capture in L2O.

In accordance with one or more aspects of the present disclosure the HT trajectory portion transits between LEO and an initial point along the LT-HI trajectory portion.

In accordance with one or more aspects of the present disclosure the LT-HI engine portion comprises solar electric propulsion (SEP) engines.

In accordance with one or more aspects of the present disclosure the LT-HI engine portion comprises chemical engines.

In accordance with one or more aspects of the present disclosure a method for generating a thrusting profile for a hybrid propulsion spacecraft for transfer between low earth orbit (LEO) and a Lissajous L2 orbit (L2O) is provided. The method includes the steps of: computing a stable manifold (SM) of trajectories leading to L2O based on thrust generated with a low thrust high specific impulse (LT-HI) engine of the hybrid propulsion spacecraft; generating a high thrust (HT) trajectory between LEO and at least one trajectory of the SM, wherein the HT trajectory is generated based at least in part with an impulse change provided by an HT engine of the hybrid propulsion spacecraft, and wherein the HT trajectory and the at least one SM trajectory form a combined trajectory from LEO to L2O; and optimizing the combined trajectory over both the HT trajectory and the at least one trajectory of the SM in combination and generating a combined optimal trajectory from LEO to L2O.

In accordance with one or more aspects of the present disclosure the at least one trajectory of the SM is a time optimal trajectory.

In accordance with one or more aspects of the present disclosure the at least one trajectory of the SM effects ballistic capture of the spacecraft at L2O.

In accordance with one or more aspects of the present disclosure the HT trajectory is at least one of a time optimal trajectory and a fuel optimal trajectory.

In accordance with one or more aspects of the present disclosure the method includes selecting the HT trajectory from a manifold of HT trajectories distributed between a time optimal trajectory and a fuel optimal trajectory.

In accordance with one or more aspects of the present disclosure the method includes optimizing the combined optimal trajectory with a global optimizer (GO) approach that is configured for application of hybrid propulsion in effecting the combined optimal trajectory.

In accordance with one or more aspects of the present disclosure the method includes commanding the HT engine portion and the LT-HI engine portion with a first and second control portion of the hybrid propulsion spacecraft and effecting spacecraft transfer with hybrid propulsion along the combined optimal trajectory commencing with an initial impulse change from LEO to initiation of ballistic capture in L2O.

Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain illustrative combinations of elements and/or functions, it should be appreciated that different combinations of elements and/or functions may be provided by alternative implementations without departing from the scope of the appended claims.

What is claimed is:

1. A control system for a hybrid propulsion spacecraft configured for transfer between low earth parking orbit (LEO) and a Lissajous L2 orbit (L2O), the control system comprising:
    a first control portion communicably connected to a high thrust (HT) engine portion of the hybrid propulsion spacecraft;
    a second control portion communicably connected to a low thrust high specific impulse (LT-HI) engine portion of the hybrid propulsion spacecraft; and
    the first and second control portions being configured to control both the HT engine portion and the LT-HI engine portion of the hybrid propulsion spacecraft to provide an optimal LEO to L2O transfer trajectory;
    wherein the optimal LEO to L2O trajectory includes an optimal LT-HI trajectory portion, selected from a stable manifold trajectory, and an optimal HT trajectory portion, and wherein the LT-HI trajectory portion and HT trajectory portion are configured for providing a combined optimal trajectory along the LEO to L2O transfer trajectory, and are optimized substantially simultaneously.

2. The system of claim 1, wherein the LT-HI trajectory portion is a time optimal trajectory.

3. The system of claim 1, wherein the LT-HI trajectory effects ballistic capture of the spacecraft at L2O.

4. The system of claim 1, wherein the HT trajectory portion is at least one of a time optimal trajectory and a fuel optimal trajectory.

5. The system of claim 1, wherein the HT trajectory portion is selected from a manifold of HT trajectories distributed between a time optimal trajectory and a fuel optimal trajectory.

6. The system of claim 1, wherein the combined optimal trajectory is optimized with a global optimizer (GO) approach that is configured for application of hybrid propulsion in effecting the combined optimal trajectory.

7. The system of claim 6, wherein the first and second control portions command the HT engine portion and the LT-HI engine portion and effect spacecraft transfer with hybrid propulsion along the combined optimal trajectory commencing with an initial impulse change from LEO to initiation of ballistic capture in L2O.

8. The system of claim 1, wherein the HT trajectory portion transits between LEO and an initial point along the LT-HI trajectory portion.

9. A spacecraft comprising;
    a spacecraft bus;
    a hybrid propulsion system connected to the spacecraft bus, the hybrid propulsion system including a high thrust (HT) engine portion, and a low thrust high specific impulse (LT-HI) engine portion; and
    a control system connected to the bus and controllably coupled to hybrid propulsion system to effect spacecraft transfer between low earth parking orbit (LEO) and a Lissajous L2 orbit (L2O), the control system being configured for generating an optimal LEO to L2O transfer trajectory employing both the HT engine portion and the LT-HI engine portion of the hybrid propulsion system;
    wherein the optimal LEO to L2O trajectory includes an optimal LT-HI trajectory portion, selected from a stable manifold trajectory, and an optimal HT trajectory portion, and wherein the LT-HI trajectory portion and HT trajectory portion are configured for providing a combined optimal trajectory along the LEO to L2O transfer trajectory, and are optimized substantially simultaneously.

10. The system of claim 9, wherein the LT-HI trajectory portion is a time optimal trajectory.

11. The system of claim 9, wherein the LT-HI trajectory effects ballistic capture of the spacecraft at L2O.

12. The system of claim 9, wherein the HT trajectory portion is at least one of a time optimal trajectory and a fuel optimal trajectory.

13. The system of claim 9, wherein the HT trajectory portion is selected from a manifold of HT trajectories distributed between a time optimal trajectory and a fuel optimal trajectory.

14. The system of claim 9, wherein the combined optimal trajectory is optimized with a global optimizer (GO) approach that is configured for application of hybrid propulsion in effecting the combined optimal trajectory.

15. The system of claim 14, wherein the first and second control portions command the HT engine portion and the LT-HI engine portion and effect spacecraft transfer with hybrid propulsion along the combined optimal trajectory commencing with an initial impulse change from LEO to initiation of ballistic capture in L2O.

16. The system of claim 9, wherein the HT trajectory portion transits between LEO and an initial point along the LT-HI trajectory portion.

17. A method for generating a thrusting profile for a hybrid propulsion spacecraft for transfer between low earth orbit (LEO) and a Lissajous L2 orbit (L2O), the method comprising the steps of:

computing a stable manifold (SM) of trajectories leading to L2O based on thrust generated with a low thrust high specific impulse (LT-HI) engine of the hybrid propulsion spacecraft;

generating a high thrust (HT) trajectory between LEO and at least one trajectory of the SM, wherein the HT trajectory is generated based at least in part with an impulse change provided by an HT engine of the hybrid propulsion spacecraft, and wherein the HT trajectory and the at least one SM trajectory form a combined trajectory from LEO to L2O; and optimizing the combined trajectory over both the HT trajectory and the at least one trajectory of the SM in combination and generating a combined optimal trajectory from LEO to L2O.

18. The method of claim 17, further comprising selecting the HT trajectory from a manifold of HT trajectories distributed between a time optimal trajectory and a fuel optimal trajectory.

19. The method of claim 17, further comprising optimizing the combined optimal trajectory with a global optimizer (GO) approach that is configured for application of hybrid propulsion in effecting the combined optimal trajectory.

20. The method of claim 19, further comprising commanding the HT engine portion and the LT-HI engine portion with a first and second control portion of the hybrid propulsion spacecraft and effecting spacecraft transfer with hybrid propulsion along the combined optimal trajectory commencing with an initial impulse change from LEO to initiation of ballistic capture in L2O.

\* \* \* \* \*